Dec. 17, 1957 C. BOUNIN 2,816,660
METHOD OF DECANTING LIQUIDS CONTAINING
MATERIAL IN SUSPENSION
Filed June 19, 1953 2 Sheets-Sheet 1
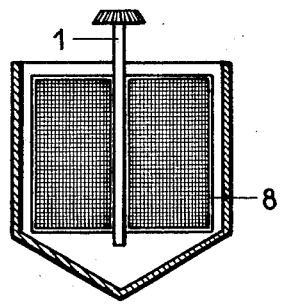
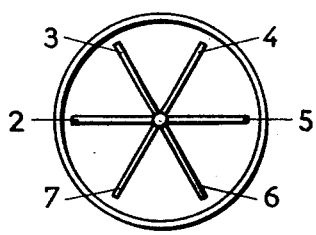
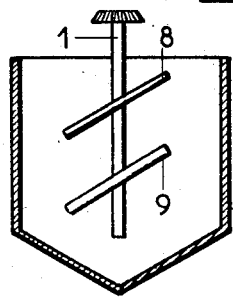
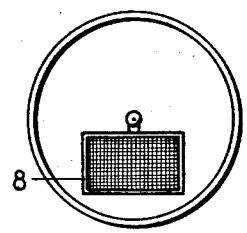
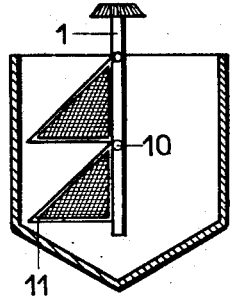
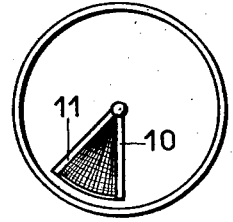
INVENTOR.
C. Bounin Dec. 17, 1957     C. BOUNIN     2,816,660
METHOD OF DECANTING LIQUIDS CONTAINING
MATERIAL IN SUSPENSION
Filed June 19, 1953     2 Sheets-Sheet 2

INVENTOR.
C. Bounin
BY
ATTYS.

United States Patent Office 2,816,660
Patented Dec. 17, 1957

2,816,660

METHOD OF DECANTING LIQUIDS CONTAINING MATERIAL IN SUSPENSION

Claude Bounin, Paris, France

Application June 19, 1953, Serial No. 362,767

Claims priority, application France December 30, 1952

2 Claims. (Cl. 210—83)

This invention relates to the decantation of liquids containing materials in suspension and the object thereof is to obtain a more rapid descent of the solid phase than it has been possible to obtain heretofore by known methods, and at the same time to obtain a greater density of the deposited sediments.

It is known that after flocculation, which can be effected by means of flocculating materials which have now been introduced into common use, there are formed, in the case of numerous suspensoids or colloids, floccules which agglomerate during decantation, producing considerable volumes of pseudo-solids having a high coefficient of viscosity which tend to retain water in their mass.

It was proposed a long time ago to produce a certain agitation in the medium being decanted, in such a manner as to produce rearrangement of the floccules and liberation of the liquid retained between the floccules.

This principle was applied by producing agitation by means of vertical rods having a round or other suitable cross-sectional shape, the object thereof being to produce in the wake which they leave behind them, disturbed channels along which the water rises.

The applicant has recognised that this method gives only a small improvement, by reason of the fact that it is based on a theory which is only partly true and that it has been applied in an incorrect manner.

It has been discovered that it is not only desirable to produce a mere rearrangement of the agglomerates, but also that it is necessary to go so far as to produce a much finer division of the mass, in such a manner as to destroy the cohesion, which is due to the interaction of the floccules on one another, by very fine cutting-up.

Applicants have also discovered that causing a hydrodynamic disturbance which destroys the agglomerates was entirely incorrect.

According to the present invention, the flocculated mass which is being decanted is cut up by means of reticulated elements such as screens or grids consisting of metal wires of very small thickness which are displaced at a very slow speed in order not to create any hydrodynamic disturbance.

For carrying the present invention into effect, wires of the order of one millimetre will be used, i. e. wires having a thickness of less than one millimetre, or of a few millimetres at most, and they will be moved at a selected speed of the order of a few centimetres per second.

It has further been discovered that an appreciably increased speed of decantation is obtained if the surface of the screens or grids makes an acute angle with the direction of displacement, it being possible to obtain an increase of up to 40% in the speed of decantation in the case of an inclined grid surface as compared with the same grid surface arranged and displaced vertically.

Some examples of ways in which the invention can be carried into effect are given hereunder; however, it is not intended that the scope of the invention be restricted to or limited by the particular features specified in these examples, which are chosen by way of illustration.

In the accompanying drawings, showing examples of the way in which the invention is carried into effect in vats of various shapes and having grid surfaces of various shapes.

Figures 1, 3, 5, 7 and 8 are vertical axial sections of cylindrical vats; and

Figures 2, 4, 6 and 9 are plan views corresponding respectively to Figures 1, 3, 5 and 8;

Figure 7:
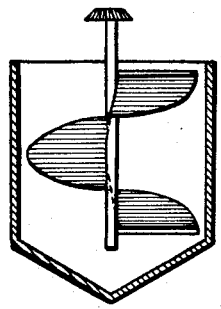

The following description will deal first of all with the case of cylindrical vats having a small diameter, for instance a diameter of a few metres. These vats will preferably have the shape of standard pointed drums.

In the example shown in Figures 1 and 2, round the shaft 1 which is driven in rotation by any suitable means are arranged a plurality of reticulated elements, such as grids or screens, for instance six grids, numbered 2 to 7 in the drawings, each grid consisting of a rigid frame 8 in which is stretched a screen of meshes formed by warp weft wires, these wires having a thickness of about 0.6 mm.

The speed of rotation and the number of frames will be so selected that the peripheral speed will be for instance of the order of 20 cms. per second, and that a grid will pass through each vertical axial section of the volume about once every two minutes.

The pointed part of the drum provides at the bottom of the vat an adequate space, not stirred by the grids, in which the decanted sediments accumulate and are evacuated continuously through conventional outlet means or by periodical flushing.

Preferably, the surfaces of the frames supporting the grids will be at a substantial angle to the direction of displacement, as shown in Figures 3 and 4. These rigid inclined frames such as 8 and 9 are rigid in rotation with the shaft 1. A plurality of frames will be provided, which are distributed over the whole height of the vat, for instance in one and the same vertical row as illustrated, and the number of rows will be made sufficiently great to ensure a frequency of intersection of the volume corresponding to the order of magnitude indicated in the preceding example. Also, frames at different levels can be offset angularly relatively to one another.

According to an alternative illustrated in Figures 5 and 6, the frames may each consist of two horizontal arms 10 and 11 fixed rigidly to the shaft 1 and offset relatively to one another both in height and angularity, the fabric of the grid being spread between these two arms, thus giving a conicoidal surface having a rectilinear generatrix forming varying angles with the direction of displacement.

According to an alternative illustrated in Figure 7, the fabric forming the grid may still more advantageously be given the form of a helicoidal surface of which the axis is the rotary shaft. The filtering unit may consist of a plurality of coaxial helices angularly offset relatively to one another, so that they can intersect the volume at a sufficient frequency without having to reach detrimental speeds.

Figure 8:
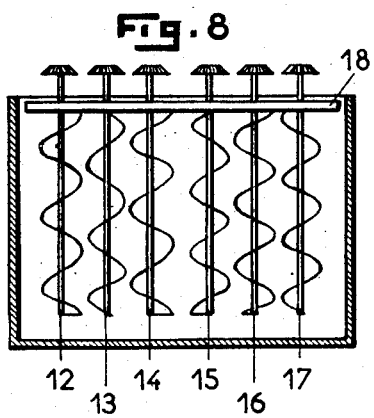
Figure 9:
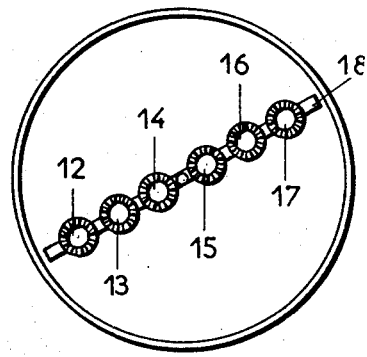

For vats having a very large diameter, in order to avoid excessively great peripheral speeds the arrangement shown in Figures 8 and 9 for instance will be adopted, in which six rotary shafts 12 to 17 are supported by a diametral transverse member 18. Each of the shafts 12 to 17 supports frames carrying grids, or helicoidal grids such as those described in the previous examples, the speeds of rotation and the frequency of intersection of the volume remaining always in the same order of magnitude.

It is possible to arrange a plurality of diametral transverse members such as 18, or to give the diametral transverse member 18 a slow rotary movement, such that the peripheral speed will not exceed the speeds indicated above.

Figure 10:
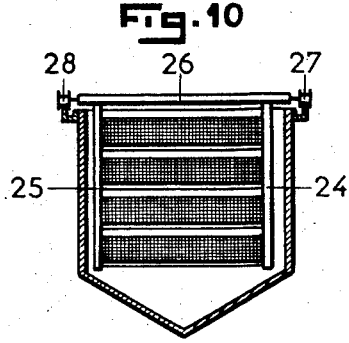
Figure 11:
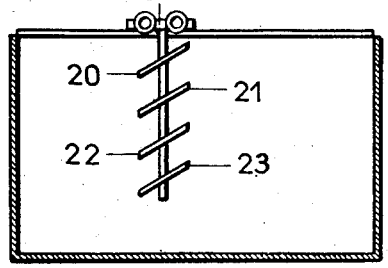
Figure 11 is a vertical section of a rectangular vat, in a plane perpendicular to the section plane of Figure 10.

Figures 10 and 11 show a way of carrying the invention into effect in the case of vats having a rectangular horizontal sectional shape; the bottom of the vats can have the shape of standard pointed drums as in the preceding examples.

Extending over the whole height of the vat is a frame carrying a grid or, preferably, a plurality of frames carrying grids and distributed over the whole height, such as 20, 21, 22 and 23 in the drawings. These frames may be attached to two lateral uprights 24 and 25 carried by a transverse beam 26, which itself is carried by two carriages 27 and 28 which are displaced along runways situated outside the vat and on each side thereof.

It is further to be pointed out that in connection with the separation of solids and liquids from suspensions the confining of a suspension establishes within a vat, tank or decanter a plurality of superposed zones. A clarified liquid zone occupies the uppermost portion of the confined suspension and beneath this is a zone of decantation or what can also be termed a zone of independent subsidence where solid particles or flocs settle independently with the settling rate being dependent upon the size and density of the particle or floc. In this zone the flocs or solid particles are spaciously separated from one another. The next subjacent zone is a zone of compression or what is also termed a zone of collective subsidence in which the settling rate decreases with the increasing concentration of solids. In this zone flocs settle under conditions determined by gravity but are closer to one another and the settling rate is influenced by particle or floc interference. The next lowermost zone is a zone of settling or what can be termed a zone of compressive subsidence wherein flocs and/or particles are in intimate contact and the subsidence is due to compression, that is the pressure of particles or flocs upon one another.

The present invention accelerates the speed of settling of flocculates or particles by releasing liquid from the flocculation particles by finely dividing the mass of suspension during separation by gravity throughout a substantial vertical extent of the confined suspension by displacing through the suspension one or more reticulated elements formed by a fine wire grid that is thin in relation to the direction of displacement at a selected speed of the order of twenty centimeters per second so as to release the liquid from the solid phase without destroying the cohesion of solid particles with one another and without creating hydrodynamic disturbances or in other words without creating any eddy currents within the suspension. As indicated previously, if the step of finely dividing the suspension throughout a substantial vertical extent thereof is affected by supporting a reticulated element or elements at an acute angle to the direction of displacement while maintaining the speed of displacement selected less than that which would create hydrodynamic disturbances then there is a substantial increase in the speed of settling.

It is further to be pointed out that the step of finely dividing the suspension is effected without applying any undue direct horizontal or vertical compressive forces so as not to entrain liquid particles during such displacement.

The suspension is therefore finely divided without exerting direct horizontal compressive forces that act perpendicular to the direction of displacement.

I claim:

1. The method of accelerating the rate of solids-liquid separation, comprising, confined a body of suspension in a circular tank having a transverse dimension varying from at least a few meters to a substantially greater dimension, and which suspension is of the type in which the solids have such weight as to be capable of eventually settling by gravity in that the solid particles can overcome the viscosity of the suspending liquid and settle by gravity, and finely dividing the mass of suspension through a substantial vertical extent thereof by only horizontally displacing through the suspension and against settling solids at least one fine wire grid by rotating the grid through the suspension about a vertical axis at a selected peripheral speed not exceeding twenty centimeters per second resulting in a release of liquid from the solid phase and effecting such fine division of the suspension without establishing any appreciable horizontal or vertical compressive forces in the suspension whereby no hydrodynamic disturbances are created.

2. The method of accelerating the rate of solids-liquid separation, comprising, confining a body of suspension in a circular tank having a transverse dimension varying from at least a few meters to a substantially greater dimension, and which suspension is of the type in which the solids have such weight as to be capable of eventually settling by gravity in that the solid particles can overcome the viscosity of the suspending liquid and settle by gravity, supporting at least one fine wire grid within the suspension and horizontally displacing the same through the suspension while maintaining the grid at an acute angle to the direction of displacement during such horizontal displacement by rotating the grid about the vertical axis at a selected peripheral speed not exceeding twenty centimeters per second to finely divide the mass of suspension and result in a release of liquid from the solid phase and effecting such fine division of the suspension without establishing any appreciable horizontal or vertical compressive forces in the suspension, whereby no hydrodynamic disturbances are created.

References Cited in the file of this patent

UNITED STATES PATENTS

| | | |
|---|---|---|
| 624,633 | Edwardes | May 9, 1899 |
| 970,823 | Hopkins | Sept. 20, 1910 |
| 1,605,596 | Langelier | Nov. 2, 1926 |
| 1,662,180 | Ball | Mar. 13, 1928 |
| 1,717,478 | Vilas | June 18, 1929 |
| 1,912,019 | Steindorf | May 30, 1933 |
| 1,938,894 | Darby et al. | Dec. 12, 1933 |
| 2,499,816 | Carter | Mar. 7, 1950 |
| 2,610,836 | Clarke | Sept. 16, 1952 |